United States Patent Office 3,136,733
Patented June 9, 1964

3,136,733
HIGHWAY MARKING COMPOSITION
Alistair J. Ross and Eduard R. de Vries, Huntingdon, Pa., assignors to Prismo Safety Corporation, Huntingdon, Pa., a corporation of Pennsylvania
No Drawing. Filed Feb. 8, 1960, Ser. No. 7,096
12 Claims. (Cl. 260—40)

This invention relates to highway marking material adapted for marking pavements of roads, streets, highways, aircraft landing strips, and the like, for defining traffic lanes, pedestrian cross-walks, traffic instructions, and the like. More particularly, the present invention relates to a composition of matter and a process for utilizing it which is very rapidly curable to yield a non-tack surface that can be subjected to traffic within a few minutes of application to the pavement.

In areas where traffic markings are subjected to heavy abrasive wear and impact, the usual highway marking paints are not satisfactory because of the necessity for frequent replacement. Further, the usual highway marking paints require relatively long drying periods varying from 15 minutes to several hours. This interferes with the flow of traffic during replacement of the markings for excessively long periods. In the past, these difficulties have been partially met by the use of preformed marking devices which may be quickly applied to the pavement surface by means of suitable adhesives or other means and which are of sufficient thickness and durability to withstand long periods of abrasive wear. Such markings may be fairly rapidly applied, however, they do not lend themselves readily to the production of continuous stripes. Moreover, those which depend upon the use of adhesives are subject to displacement or loss due to the failure of the adhesives under the conditions of traffic and weathering.

The use of self adhesive plastic materials, which may be applied in thick continuous stripes, has been previously proposed; however, experience has shown that these materials retain a considerable degree of tackiness during the first few hours after their application, and do not adhere well to the pavement when subjected to traffic and weather conditions. In those cases where good durability has been obtained, it was found that the material was too brittle so that failure occurred at the bond between the coating material and the sub-stratum, in such applications where high impact resistance is required.

It is therefore an object of the present invention to provide a new traffic marking material which may be quickly applied as a continuous stripe and which becomes cured to a hard solid in minutes and which may be subjected to traffic immediately thereafter.

It is a further object of the present invention to provide an improved traffic marking material which may be continuously applied to a pavement by spraying and which adheres to the pavement and which, on application, becomes free of surface tackiness in a few minutes.

It is a still further object of the present invention to provide an improved traffic marking material which may be quickly applied to a pavement with glass beads applied thereon and which cures quickly to a hard material retaining the glass beads in its upper surface even when subjected to traffic conditions.

A still further object of the present invention is to provide an improved traffic marker for highways which has higher flexibility and elasticity and is particularly resistant to the effects of traffic and weather conditions.

A still further object of the invention is to provide an improved coating material which utilizes a novel combination of accelerators which acts on the material to effect a smooth controlled polymerization resulting in a coating of increased flexibility.

Another object of the invention is to provide a novel combination of accelerators particularly suited for controlling the curing rate of the reaction between a polyester resin composition and a polyisocyanate.

Markings for pavements of roads, streets, highways, and the like have unusual requirements not to be found in usual coating compositions. The markings must be durable and resistant for long periods of time to wear from traffic and to various environmental changes occasioned by the weather. The markings must have high impact resistance and must be resistant to cracking and chipping, and must adhere satisfactorily to a wide variety of pavement material under traffic and climatic conditions. Application of the markings must be rapid, along with a rapid drying or curing of the markings. It is important that traffic not be delayed unduly while such markings are applied and cured.

In accordance with the present invention, a traffic marking material which meets the objects of this invention can be prepared by admixing one or more polyester resins containing a reactive unsaturated monomer, a material similar to tolylene diisocyanate, pigments, extenders, catalysts and a particular combination of accelerators for the polyester resins-diisocyanate system. The resulting marking material has been found to have exceptional adhesion to the pavement, high impact and abrasion resistance, low curing time, good adhesion to glass beads, and increased flexibility.

The use of polyester resin compositions as binders in traffic paints has been previously proposed, however, many shortcomings have been found in the use of such traffic paints. Such paints have shown a lack of abrasion resistance, a brittleness resulting in cracking under impact, and a lack of adhesion to pavement surfaces.

Unexpectedly, it has been discovered that flexible polyester resins, which are normally slow curing, with or without a certain percentage of rigid, quick curing polyester resins, when mixed with polyisocyanates or modified polyisocyanates, and a particular system of catalysts and accelerators for the polyester resins-isocyanate mixture yield a composition which is very tough, exceptionally flexible and resistant to abrasion and impact and which adheres well to the pavement and to glass beads.

To prove this, two sets of samples of traffic paint containing the same pigmentation but with different binders were applied to concrete slabs and submitted to accelerated weathering tests using a weatherometer. The samples containing a polyester resin composition alone as the binder in the traffic paint lasted in the weatherometer test from 100 to 300 hours until failure of the coating. The samples containing the polyester resin composition in accordance with the present invention as the binder lasted in the weatherometer test from 500–3700 hours without failure. This test demonstrates the tremendous increase in durability given to the marker utilizing the compositions of the present invention over the use of a polyester resin composition as previously suggested.

The weatherometer exposure indicated heretofore was in accordance with A.S.T.M. procedures except that a freezing cycle of two hours out of every 24 hours was added, in order to introduce higher temperature differentials and more severe strains.

The failures noted with the sample containing the polyester resin composition alone were cracking, chipping and general loss of adhesion. The samples in accordance with the present invention, on the other hand, were found to have a tough, flexible consistency and had excellent adhesion.

In order to obtain the desired flexibility, the use of flexible polyester resins or a mixture of flexible and rigid polyester resins would appear to be a solution to the problem. However, it has been found that flexible polyester resins cure very slowly and are considerably air inhibited to the point that extreme tackiness occurs. When curing finally takes place, brittleness eventually occurs. It is obvious that these materials do not lend themselves to applications in traffic paints that are required to dry very quickly and have high abrasion resistance.

It has now been discovered that such slow curing flexible polyesters, with or without a portion of quick curing rigid polyesters, can be utilized as a traffic marking material by adding polyisocyanates or modified polyisocyanates in conjunction with a particular system of catalysts and accelerators. Apparently the inherent tackiness of the polyester is overcome through the crosslinking of the residual hydroxyl groups with the free isocyanate groups catalyzed by the amines present.

The blending of the flexible and rigid polyesters in the absence of the isocyanate does not give the same results as are obtained by the addition of the isocyanate thereto. In the absence of isocyanate, in order to obtain the desired flexibility, the percentage of the flexible resin must be so high that no room temperature cure in a reasonable time is obtained. Air inhibition occurs to the point that a soft, tacky, cheesy top layer results. Further, the abrasion resistance of the flexible resin in the absence of the isocyanate, is very, very low and the bonding to such sub-strata as concrete and asphalt is not satisfactory. The presence of the isocyanate upgrades the adhesion to the point where it is satisfactory for use as a traffic paint. The accelerators heretofore proposed for such a composition have not been found completely satisfactory, since the reaction was found to be too rapid resulting in an irregular polymer growth which was less flexible and tough than the present invention and the resulting material had an appreciable color thereto.

Coating compositions in accordance with this invention contain the following proportions of ingredients:

```
                                                  Parts by weight
Mixture No. 1:
    Flexible polyester resin composition_____    50-100
    Rigid polyester resin composition_____    0-50
    Extenders and pigments_____    0-100
    Combination of accelerators_____    1.25-4.5
Mixture No. 2:
    Polyisocyanate _____    1-50
    Catalyst for the polyester resins_____    1-10
    Unsaturated polymerizable monomer solvent or
      nonpolymerizable solvent such as benzene,
      toluene, etc._____    5-50
```

Immediately prior to use, the first mixture is placed in the supply container of a line striping machine. Mixture No. 2 is preferably packaged in two parts. The first part contains the polyisocyanate solution and the second part contains the catalyst and the solvent. The two parts are mixed immediately before use. If the solvent is a polymerizable monomer such as styrene, it can be added to the polyisocyanate instead of the catalyst. The polymerizable monomer is used in cases where the presence of a high percentage of a nonpolymerizable solvent such as benzene is not desirable. Thus, the pigmented polyester resin composition is sprayed from the machine and is admixed with the polyisocyanate and peroxide catalyst before reaching the surface being coated. The cure takes place almost instantly. Two curing reactions take place in this system at the same time and complement each other. The free isocyanate reacts immediately with the residual hydroxyl groups of polyesters. This reaction is catalyzed by the amine accelerators present, and is also catalyzed to a certain extent by the peroxide catalyst present. In addition, the second curing reaction is the usual curing of the polyester with the peroxide catalyst and amine accelerators.

Because of these two chemical reactions, it is possible to use 100% flexible polyester resin and obtain the same curing time as for the rigid polyester by itself. Surface tack disappears more quickly than with the rigid polyester by itself. Abrasion resistance is higher and impact resistance is very high because of the resulting flexibility.

Part of the isocyanate will form a chemical bond with the road surface, thus improving adhesion both chemically and physically. The addition of a certain percentage of a rigid polyester acts to speed up the curing time somewhat.

The combination of accelerators for the polyester diisocyanate mixture referred to heretofore is a combination of two particular tertiary amines. The first tertiary amine is an aryl alkyl amine of the general configuration

where $R_1$ and $R_2$ are short chain alkyl groups or substituted alkyl groups and $R_3$ is a phenyl or substituted phenyl group. Examples of such aryl alkyl amines are dimethylaniline, diethylaniline, dimethyl-p-toluidine, etc.

The second tertiary amine used in the combination which has been effective is selected from the following:

(1) Tertiary alkyl amines of the general configuration

where $R_1$, $R_2$ and $R_3$ are alkyl groups or substituted alkyl groups containing not more than 25 carbon atoms and where at least one of the three groups has at least 4 carbon atoms.

Examples are as follows:

(a) Where $R_1$ and $R_2$ are methyl groups and $R_3$ is a fatty acid radical, such as Hydrogenated tallow _____ (Armeen DM18D).
    Coco _____ (Armeen DM16D).
    Soya _____ (Armeen DMSD).
    Cetyl _____ (Armeen DMSD).
    Stearyl _____ (Armeen DMHTD).

All available from Armour Chemical Co., Chicago 9, Illinois (b) Dibutyl amino ethanol (c) Where $R_1$ is a short chain alkyl group and $R_2$ and $R_3$ are fatty acid radicals as above.

(d) Where $R_1$, $R_2$ and $R_3$ are fatty acid radicals, either similar dissimilar, such as:

Trilaurylamine _____ (Alamine 304).
    Tricocoamine _____ (Alamine 321).
    Tricaprylylamine _____ (Alamine 336).

All are available from General Mills Chemical Division, Kankakee, Illinois.

(2) Alkyl aryl amines of the following general configuration:

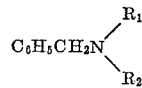

where $R_1$ may be alkyl, aryl or alkanol, and $R_2$ may be aryl or alkanol such as:

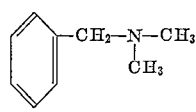

(a) N-BENZYL-N-METHYL-N ETHANOLAMINE

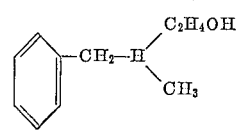

(b) N,N-DIBENZYL-ETHANOLAMINE

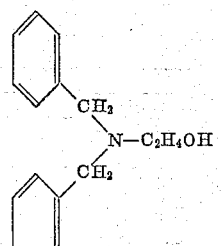

(c) N,N-DIBENZYL-METHYLAMINE

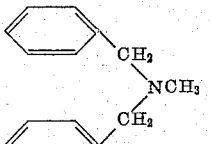

(d) N-BENZYL-N,N-DIETHANOLAMINE

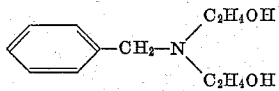

All of the above are available from Sumner Chemical Co., Six East 45th Street, New York 17, New York.

(3) Triethylenediamine

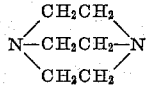

Available from Houdry Process Corporation, Philadelphia 2, Pennsylvania, Trade Dabco.

The particular system of accelerators has been found to give smoother and more controlled polymerization resulting in increased flexibility. This system of accelerators gives the improved physical properties due to a more orderly polymer growth, and this is believed to result in a more linear polymer with a reduced amount of short chain heavily branched polymer.

Utilizing this system of accelerators, there is a period of about two minutes in which there is virtually no change in viscosity followed by a smooth rapid gelation. This permits the material to be sprayed together and to flow onto the substratum, giving an excellent adhesive bond and facilitating the incorporation of reflective glass beads, if desired.

When primary or secondary amines, as previously proposed, are used in combination with the dimethyl aniline, or its equivalent, as the system of accelerators for the polyester-diisocyanate mixture, the reaction is too rapid, resulting in a more uneven, irregular polymer growth, with local concentrations of over and under catalyzed material. Gelation is so rapid that flow onto the substratum is reduced and the adhesive bond is somewhat weaker. The flexibility, toughness and color of such formulations are inferior to the material produced substituting these tertiary amines for the primary or secondary amines.

Of the amines listed above for the second amine used in the combination, those found most suitable were dimethyl coco amine distilled, tricaprylyl amine, N,N, dibenzyl-N-methylamine and triethylene diamine. These tertiary amines were found to yield optimum film flexibility, freedom from foaming, low color development, rapid smooth gelation, and thorough curing.

Not all tertiary amines have been found suitable due to excessive color formation, foaming, poor film flexibility, or unduly rapid or unduly slow reaction.

It should be noted that when the first tertiary amine of the combination is used alone without the second amine, the time of curing is unduly lengthened. When the second tertiary amines in the combination are used alone they will not act as the peroxide catalyst activators. It has been found that the combination of the tertiary amines described above however, acts synergetically to effect the desired cure of the binder.

Polyester resin compositions suitable for use in this invention are those that are commonly classed as "cold cured" polyester compositions that cure in less than 10 minutes in the presence of a suitable catalyst and accelerator without the necessity of an application of pressure or an external source of heat. In general, these compositions comprise an unsaturated polyester resin and a monomeric polymerizable material that does not give off volatile matter during curing.

Polyester resins are a class of resins, which is well known to those skilled in the art. In general, polyester resins are unsaturated alkyd resins formed by the reaction of one or more dicarboxylic acid components and one or more polyhydric alcohols. Illustrative of the dicarboxylic acid components are the saturated components phthalic anhydride and adipic and azelaic acids, and the unsaturated components, fumaric acid and maleic acid. Illustrative of the dihydric alcohols most commonly used are glycols of ethylene, propylene, 1,3- and 2,3- butylene, diethylene and dipropylene. An unsaturated monohydric alcohol, such as allyl alcohol, may be used in place of part of the polyhydric alcohol. One or more of the acid components or polyhydric alcohols should contain a reactive double bond or ethylenic linkage. It is essential that one of the components of the polyester resin contain an unsaturated ethylenic linkage. The polyester reaction products are mixed with a nonvolatile unsaturated monomeric crosslinking agent for the polyester resin. Illustrative of the monomeric agents are the unsaturated hydrocarbons, such as styrene, vinyl toluene, vinyl acetate, methyl methacrylate, alpha and para methyl styrene, divinyl benzene, ethyl acrylate, acrylonitrile, diallyl esters, cyclo pentadiene, triallyl cyanurate and many others. The monomeric agent serves to make the polyester resin more fluid and also to crosslink the resin at the time of curing to produce a crosslinked or three dimensional polyester resin, which is thermosetting in character. The monomeric agent is of a nature that it is consumed during the curing of the resin without forming volatile materials.

The properties of the polyester resin compositions can be varied through the use of various dibasic acids, different glycols, and different monomers, each in varying ratio to the others, permitting preparation of end products with almost any desired properties. Certain of these polyester resins form masses upon curing that are very rigid or inflexible, while others form more flexible, rubbery masses. Rigid and flexible type polyester resins are available commercially. Generally speaking, the rigid type polyester resins are characterized as being the product of components containing larger amounts of unsaturated components than do the flexible type polyester resins. The flexible polyester resins contain a much lower percentage of the polymerizable monomer, as styrene, mixed with it. The flexible polyester resin contains less unsaturation in the molecular structure. Consequently, crosslinking with the polymerizable monomer after curing results in fewer cross-links per unit distance along the molecule. Generally, the acids used in the preparation of a flexible polyester are longer in chain length, such as for example, adipic acid. Flexible polyester resins, as a result of less unsaturation are much longer in curing time when cured with the usual catalysts and accelerators. Post curing is usually necessary at elevated temperatures to remove surface tackiness.

A typical flexible polyester resin can be prepared from 146 parts of adipic acid, 203 parts of fumaric acid, 228 parts of phthalic anhydride, and 342 parts of propylene glycol, by heating at 190–195° C. in the presence of an azeotropic solvent (e.g. xylol) until a suitable acid value (approximately 20) and viscosity are obtained. This syrupy viscous resin is cooled to around 120° C. and thinned with styrene or other polymerizable monomer in the ratio of 30 parts of monomer to 70 parts of the resin to obtain a flexible polymerizable polyester resin composition.

A typical rigid polyester resin can be similarly prepared from 148 parts of phthalic anhydride, 348 parts of fumaric acid, 107 parts of ethylene glycol and 182 parts of propylene glycol by heating until an acid value of 20–25 is reached and thinning with styrene or other polymerizable monomer in the ratio of 30 parts of monomer to 70 parts of the resin at 120° C. to obtain a rigid polymerizable polyester resin composition.

The pigment is added to the formulation to impart reflection to the coating composition as well as color and opacity, and the extenders impart structural strength to the film. To produce a white coating composition, it is necessary to have a prime pigment, such as rutile titanium dioxide, to furnish the necessary whiteness and opacity. In place of the rutile titanium dioxide, anatase titanium dioxide may be substituted. Other pigments that may be used for white and colored coatings are as follows: aluminum oxide, iron oxide, silicon carbide, antimony oxides, lead oxide, lead chromates, zinc chromates, cadmium pigments, siennas, umbers, inorganic or organic reds, chrome yellows, chrome oranges, chrome greens, etc. The pigments can be extended with barium sulphate, calcium sulphate, magnesium silicate, zinc oxides, zinc sulphide, normal or high strength lithopones, diatomaceous silica, amorphous and crystalline silica, micaceous materials, barium sulphate, whiting, wollastonite pumices, calcium carbonate, clay, talc, perlite, asbestos, granular marble, sand, glass beads, and other natural or manufactured granular materials.

Suitable catalysts which are added to the formulation to cure the polyester resin composition may be selected from a large number of oxidizing catalysts such as benzoyl peroxide, di-t-butyl peroxide, etc. with which those skilled in the art are familiar. For rapidly curing polyester compositions, the catalyst at least in part is benzoyl peroxide.

It should be understood that small glass spheres having a diameter up to 13 mils can be incorporated in these formulae as a premix at a ratio of up to 8 lbs. of spheres per gallon of paint. It is further contemplated that glass spheres of 5 to 40 mils in diameter can be distributed onto the surface of the marker before the material has cured. When the material has cured, the glass beads are retained in partially embedded state on the surface of the marker to yield a high auto-collimating efficiency to the marker.

The catalyst and the polyisocyanate may be dissolved or dispersed in a monomeric polymerizable solvent such as vinyl toluene or any of the others mentioned heretofore, or in a non-polymerizable solvent, e.g. benzene, toluene, etc.

The catalyst, e.g., benzoyl peroxide, may be predispersed or dissolved in a non-polymerizable solvent, e.g. benzene and this solution or dispersion added to the polyisocyanate as described heretofore.

The polyisocyanate which is used may be tolylene diisocyanate. Because of the toxicity of this material however, we prefer to use the reaction product of tolylene diisocyanate and an alcohol, such as trimethylolpropane. This material has a higher molecular weight, the toxicity is considerably reduced, and yet the action is similar to that obtained with the tolylene diisocyanate. A commercially available product suitable for this use is Mondur CB-75 from Mobay Chemical. Other similar polyol modified polyisocyanates may be used.

The following specific examples of formulations in accordance with this invention are illustrative only and should not be construed as limiting the scope of the invention.

*Example 1*

| Mixture No. 1: | Parts by weight |
|---|---|
| Flexible polyester resin composition | 100 |
| Titanox RA | 30 |
| Dimethylaniline | 1 |
| Dimethyl coco amine | 3 |
| Mixture No. 2: | |
| Benzoyl peroxide | 3 |
| Polyol modified polyisocyanate | 25 |
| Vinyl toluene, styrene or benzene | 10 |

The two mixtures are packaged separately. On the job, the two mixtures are sprayed into one another onto the substratum to be coated. The curing reaction begins within a few minutes and proceeds rapidly without heating and in a matter of minutes the composition has cured to a solid coating without surface tack which may be traversed by traffic at once.

The Titanox RA is a white titanium dioxide pigment. The polyol modified polyisocyanate used in the example was Mondur CB-75, which is the reaction product of tolylene diisocyanate and trimethylol propane.

*Example 2*

| Mixture No. 1: | Parts by weight |
|---|---|
| Flexible polyester resin composition | 100 |
| Titanium dioxide | 67 |
| Dimethylaniline | 1 |
| Triethylene diamine | 3 |
| Mixture No. 2: | |
| Benzoyl peroxide | 3 |
| Tolylene diisocyanate | 25 |
| Vinyl toluene | 10 |

The two mixtures are intimately mixed and gelation followed by complete curing occurs in a few minutes. The flexibility of the resulting film is remarkable. For example, a 20 mil film drawn down on paper may be bent through 180° several times without splitting.

*Example 3*

| Mixture No. 1: | Parts by weight |
|---|---|
| Flexible polyester resin composition | 100 |
| Dimethylaniline | 1 |
| Tricaprylylamine | 3 |
| Mixture No. 2: | |
| Benzoyl peroxide | 3 |
| Mondur CB-75 | 10 |
| Vinyl toluene | 10 |

A 20 mil film of the two mixtures drawn down on paper after curing results in a flexible, transparent laminate.

Utilizing formulations, as described herein, it is possible to apply the lane lines on roads in heavily traveled areas without substantial delay to the passage of traffic. Liquid spray apparatus for road stripping equipped with two nozzles may be utilized to spray the two materials, with provision made to have the sprays from the two nozzles meeting near or at the point of deposition of the admixture. A movable vehicle, having mounted thereon two spraying devices, each with a supply tank and spray nozzle, provides a convenient and suitable application means for the sprays. Reflectorization unit dispensers, which are used to deposit reflectorization units, such as glass beads, immediately after deposition of the marking, can be used to dispense the beads. Other types of catalyst spray guns may also be utilized.

The process of the invention comprises intermixing two compositions, the first containing the pigmented binder composition and the accelerators, and the second containing the catalyst for the polyester resin composition and the polyisocyanate. After the two compositions have been mixed a short time, the mixture cures to a hard infusible state. The mixture is applied to the pavement of a road, street, highway or the like, prior to the curing to the hard, infusible state. If reflectorization is desired, glass beads are applied to the upper surface of the marking prior to the curing.

The compositions described heretofore are not only useful as highway marking paints but may be used in any application on any substratum where a quick curing, high abrasion and impact-resistant coating is needed. It is contemplated that these compositions can be used in industrial plants as resistant wall and floor coatings and the like. Many additional uses are also contemplated.

It will be obvious to those skilled in the art that various changes may be made without departing from the spirit of the invention and, therefore, the invention is not limited to what is described in the specification, but only as indicated in the appended claims.

What is claimed is:

1. A coating on a base surface resulting from the admixture of a composition essentially comprising a mixture of at least one polyester resin composition selected from the group consisting of flexible polyester resins and a mixture of flexible and rigid polyester resins, pigments, extenders, polymerization catalyst for said polyester resin composition, a polyisocyanate, and a combination of accelerators for the mixture, said polyester resin composition comprising the reaction product of at least one dicarboxylic acid and at least one polyhydric alcohol wherein at least one acid or alcohol component contains a reactive double bond, in admixture with a vinylidene monomer copolymerizable therewith, said combination of accelerators comprising at least two tertiary amines, at least one of said tertiary amines being selected from the group consisting of tertiary amines having the configuration

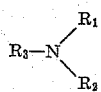

where $R_1$ and $R_2$ are short chain alkyl radicals and $R_3$ is selected from the group consisting of phenyl and benzyl radicals, and at least one of said tertiary amines being selected from the group consisting of (1) tertiary amines having the configuration

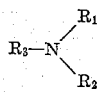

where $R_1$, $R_2$ and $R_3$ are selected from the group consisting of alkyl radicals, fatty acid radicals and alkanol radicals containing not more than 25 carbon atoms in the radical where at least one of the three radicals has at least 4 carbon atoms, (2) tertiary amines having the configuration

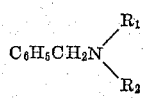

where $R_1$ is selected from the group consisting of alkyl, aryl and alkanol radicals, and $R_2$ is selected from the group consisting of aryl and alkanol radicals, and (3) triethylene diamine, said mixture curing to a dry condition within several minutes after addition of said catalyst and polyisocyanate to the remaining ingredients.

2. A coating on a base surface resulting from the admixture of a composition essentially comprising a mixture of at least one polyester resin composition selected from the group consisting of flexible polyester resins and a mixture of flexible and rigid polyester resins, polymerization catalyst for said polyester resin composition, a polyisocyanate, and a combination of accelerators for the mixture, said polyester resin composition comprising the reaction product of at least one dicarboxylic acid and at least one polyhydric alcohol wherein at least one acid or alcohol component contains a reactive double bond, in admixture with a vinylidene monomer copolymerizable therewith, said combination of accelerators comprising at least two tertiary amines, at least one of said tertiary amines being selected from the group consisting of tertiary amines having the configuration

where $R_1$ and $R_2$ are short chain alkyl radicals and $R_3$ is selected from the group consisting of phenyl and benzyl radicals, and at least one of said tertiary amines being selected from the group consisting of (1) tertiary amines having the configuration

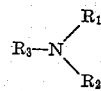

where $R_1$, $R_2$ and $R_3$ are selected from the group consisting of alkyl radicals, fatty acid radicals and alkanol radicals containing not more than 25 carbon atoms in the radical where at least one of the three radicals has at least 4 carbon atoms, (2) tertiary amines having the configuration

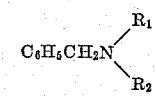

where $R_1$ is selected from the group consisting of alkyl, aryl and alkanol radicals, and $R_2$ is selected from the group consisting of aryl and alkanol radicals, and (3) triethylene diamine, said mixture curing to a dry condition within several minutes after addition of said catalyst and polyisocyanate to the remaining ingredients.

3. A coating in accordance with claim 1 wherein said polyisocyanate is the reaction product of tolylene diisocyanate and trimethylol propane.

4. A coating in accordance with claim 1 wherein said composition contains up to 8 lbs. per gallon of the composition of small glass spheres having a diameter up to 13 mils.

5. A coating on a base surface resulting from the admixture of a composition consisting essentially of a mixture of 50–150 parts of at least one polyester resin composition, 0–100 parts pigments and extenders, 1.25–4.5 parts of a combination of accelerators for said mixture, 1–10 parts polymerization catalyst for said polyester resin composition, 1–50 parts polyisocyanate, and 5–50 parts of a solvent, said combination of accelerators comprising .25–1.5 parts of at least one member selected from the group consisting of tertiary amines having the configuration

where $R_1$ and $R_2$ are short chain alkyl radicals and $R_3$ is selected from the group consisting of phenyl and benzyl radicals, and 1–3 parts of at least one member selected from the group consisting of (1) tertiary amines having the configuration

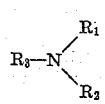

where $R_1$, $R_2$ and $R_3$ are selected from the group consisting of alkyl radicals, fatty acid radicals and alkanol radicals containing not more than 25 carbon atoms in the radical where at least one of the three radicals has at least 4 carbon atoms, (2) tertiary amines having the configuration

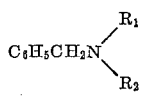

where $R_1$ is selected from the group consisting of alkyl, aryl and alkanol radicals, and $R_2$ is selected from the group consisting of aryl and alkanol radicals, and (3) triethylene diamine, said polyester resin composition being selected from the group consisting of flexible polyester resins and a mixture of flexible and rigid polyester resins, said polyester resin composition comprising the reaction product of at least one dicarboxylic acid and at least one polyhydric alcohol wherein at least one acid or alcohol component contains a reactive double bond, in admixture with a vinylidene monomer copolymerizable therewith, said mixture curing to a dry condition within several minutes after admixture of said accelerator, catalyst and polyisocyanate with the remaining ingredients.

6. A coating in accordance with claim 1 where the first tertiary amine is dimethyl aniline.

7. A coating on a base surface resulting from the admixture of a composition essentially consisting of:

Mixture No. 1: Parts by weight
  Flexible polyester resin composition _____ 50–100
  Rigid polyester resin composition _____ 0–50
  Extenders and pigments _____ 0–100
  Combination of accelerators _____ 1.25–4.5
Mixture No. 2:
  Polyisocyanate _____ 1–50
  Catalyst for said polyester resin _____ 1–10
  Solvent _____ 5–50 said combination of accelerators comprising .25–1.5 parts of at least one member selected from the group consisting of tertiary amines having the configuration

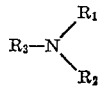

where $R_1$ and $R_2$ are short chain alkyl radicals and $R_3$ is selected from the group consisting of phenyl and benzyl radicals, and 1–3 parts of at least one member selected from the group consisting of (1) tertiary amines having the configuration

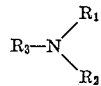

where $R_1$, $R_2$ and $R_3$ are selected from the group consisting of alkyl radicals, fatty acids radicals and alkanol radicals containing not more than 25 carbon atoms in the radical where at least one of the three radicals has at least 4 carbon atoms, (2) tertiary amines having the configuration

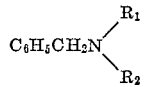

where $R_1$ is selected from the group consisting of alkyl, aryl and alkanol radicals, and $R_2$ is selected from the group consisting of aryl and alkanol radicals, and (3) triethylene diamine, said polyester resin compositions comprising the reaction products of at least one dicarboxylic acid and at least one polyhydric alcohol wherein at least one acid or alcohol component contains a reactive double bond, in admixture with a vinylidene monomer copolymerizable therewith, said composition curing to a dry condition within several minutes after admixture of the two mixtures.

8. A coating on a base surface resulting from the admixture of a composition essentially consisting of:

Mixture No. 1: Parts by weight
  Flexible polyester resin composition _____ 100
  Titanium dioxide pigment _____ 67
  A combination of accelerators _____ 4
Mixture No. 2:
  Polyisocyanate _____ 15
  Benzoyl peroxide _____ 5
  Vinyl toluene _____ 10 said combination of accelerators comprising 1 part of at least one member selected from the group consisting of tertiary amines having the configuration

where $R_1$ and $R_2$ are short chain alkyl radicals and $R_3$ is selected from the group consisting of phenyl and benzyl radicals, and 3 parts of at least one member selected from the group consisting of (1) tertiary amines having the configuration

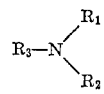

where $R_1$, $R_2$ and $R_3$ are selected from the group consisting of alkyl radicals, fatty acid radicals and alkanol radicals containing not more than 25 carbon atoms in the radical where at least one of the three radicals has at least 4 carbon atoms, (2) tertiary amines having the configuration

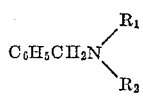

where $R_1$ is selected from the group consisting of alkyl, aryl and alkanol radicals, and $R_2$ is selected from the group consisting of aryl and alkanol radicals, and (3) triethylene diamine, said polyester resin compositions comprising the reaction products of at least one dicarboxylic acid and at least one polyhydric alcohol wherein at least one acid or alcohol component contains a reactive double bond, in admixture with a vinylidene monomer copolymerizable therewith, said composition curing to a dry condition within several minutes after admixture of the two mixtures.

9. A method of coating a base surface which comprising intermixing two mixtures at the point of use of the cured product, the first mixture comprising the polyester resin composition and a particular combination of accelerators, and the second mixture comprising the polyisocyanate, a catalyst for the polyester resin, and a solvent for the polyester resin, said polyester resin composition comprising the reaction product of at least one dicarboxylic acid and at least one polyhydric alcohol wherein at least one acid or alcohol component contains a reactive double bond, in admixture with a vinylidene monomer copolymerizable therewith, said combination of accelerators comprising at least two tertiary amines, at least one of said tertiary amines being selected from the group consisting of tertiary amines having the configuration

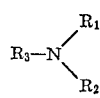

where $R_1$ and $R_2$ are short chain alkyl radicals and $R_3$ is selected from the group consisting of phenyl and benzyl radicals, and at least one of said tertiary amines being selected from the group consisting of (1) tertiary amines having the configuration

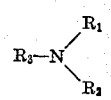

where $R_1$, $R_2$ and $R_3$ are selected from the group consisting of alkyl radicals, fatty acid radicals and alkanol radicals containing not more than 25 carbon atoms in the radical where at least one of the three radicals has at least 4 carbon atoms, (2) tertiary amines having the configuration

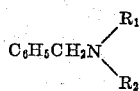

where $R_1$ is selected from the group consisting of alkyl, aryl and alkanol radicals, and $R_2$ is selected from the group consisting of aryl and alkanol radicals, and (3) triethylene diamine.

10. A coating on a base surface resulting from the admixture of:

| Mixture No. 1: | Parts by weight |
|---|---|
| Flexible polyester resin composition | 50–100 |
| Rigid polyester resin composition | 0–50 |
| Extenders and pigments | 0–100 |
| Dimethylaniline | 1 |
| Dimethylcocoamine | 3 |

| Mixture No. 2: | |
|---|---|
| Polyisocyanate | 1–50 |
| Benzoylperoxide | 1–10 |
| Solvent | 5–50 | said polyester resin compositions comprising the reaction products of at least one dicarboxylic acid and at least one polyhydric alcohol wherein at least one acid or alcohol component contains a reactive double bond, in admixture with a vinylidene monomer copolymerizable therewith, said coating curing to a dry condition within several minutes after admixture of the two mixtures.

11. A coating on a base surface resulting from the admixture of:

| Mixture No. 1: | Parts by weight |
|---|---|
| Flexible polyester resin composition | 50–100 |
| Rigid polyester resin composition | 0–50 |
| Extenders and pigments | 0–100 |
| Dimethylaniline | 1 |
| Tricaprylamine | 3 |

| Mixture No. 2: | |
|---|---|
| Polyisocyanate | 1–50 |
| Benzoylperoxide | 1–10 |
| Solvent | 5–50 | said polyester resin compositions comprising the reaction products of at least one dicarboxylic acid and at least one polyhydric alcohol wherein at least one acid or alcohol component contains a reactive double bond, in admixture with a vinylidene monomer copolymerizable therewith, said coating curing to a dry condition within several minutes after admixture of the two mixtures.

12. A coating on a base surface resulting from the admixture of:

| Mixture No. 1: | Parts by weight |
|---|---|
| Flexible polyester resin composition | 50–100 |
| Rigid polyester resin composition | 0–50 |
| Extenders and pigments | 0–100 |
| Dimethylaniline | 1 |
| N N dibenzyl N-methylamine | 3 |

| Mixture No. 2: | |
|---|---|
| Polyisocyanate | 1–50 |
| Benzoylperoxide | 1–10 |
| Solvent | 5–50 | said polyester resin compositions comprising the reaction products of at least one dicarboxylic acid and at least one polyhydric alcohol wherein at least one acid or alcohol component contains a reactive double bond, in admixture with a vinylidene monomer copolymerizable therewith, said coating curing to a dry condition within several minutes after admixture of the two mixtures.

References Cited in the file of this patent

UNITED STATES PATENTS

| 2,330,843 | Rodli | Oct. 5, 1943 |
| 2,450,552 | Hurdis | Oct. 5, 1948 |
| 2,480,928 | Hurdis | Sept. 6, 1949 |
| 2,764,565 | Hoppe et al. | Sept. 25, 1956 |
| 2,824,502 | Rockwell | Feb. 25, 1958 |
| 2,883,359 | Muller | Apr. 21, 1959 |
| 2,897,732 | Shuger | Aug. 4, 1959 |

FOREIGN PATENTS

| 211,855 | Australia | of 1955 |
| 601,395 | Great Britain | of 1948 |

OTHER REFERENCES

Polyesters and Their Application, by Bjorksten Research Lab. Inc., 1956, Reinhold Pub. Corp., N.Y. pages 46–72 incl., and pages 137, 230 and 231.

UNITED STATES PATENT OFFICE
CERTIFICATE OF CORRECTION

Patent No. 3,136,733                        June 9, 1964

Alistair J. Ross et al.

It is hereby certified that error appears in the above numbered patent requiring correction and that the said Letters Patent should read as corrected below.

Column 4, lines 65 to 69, strike out

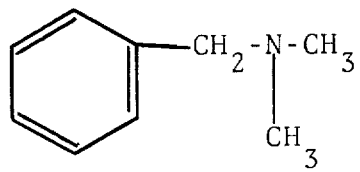

same column 4, lines 71 to 75, the formula should appear as shown below instead of as in the patent:

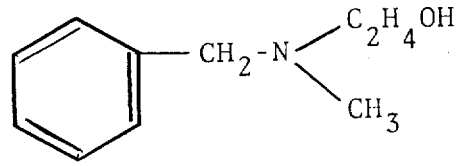

Signed and sealed this 27th day of July 1965.

(SEAL)
Attest:

ERNEST W. SWIDER
Attesting Officer

EDWARD J. BRENNER
Commissioner of Patents